United States Patent
Liao et al.

(10) Patent No.: US 7,564,693 B2
(45) Date of Patent: Jul. 21, 2009

(54) POWER SAVING WAKE-UP DEVICE FOR WIRELESS MOUSE

(75) Inventors: Tung-Tsai Liao, Hsinchu (TW); Lih-Shang Lo, Jubei (TW)

(73) Assignee: Sunplus Technology Co., Inc., Hsinchu (TW)

( * ) Notice: Subject to any disclaimer, the term of this patent is extended or adjusted under 35 U.S.C. 154(b) by 540 days.

(21) Appl. No.: 11/274,415

(22) Filed: Nov. 16, 2005

(65) Prior Publication Data

US 2007/0079155 A1    Apr. 5, 2007

(30) Foreign Application Priority Data

Oct. 3, 2005    (TW) .............................. 94134486 A

(51) Int. Cl.
H05K 7/02    (2006.01)
H05K 7/06    (2006.01)
H05K 7/08    (2006.01)
H05K 7/10    (2006.01)

(52) U.S. Cl. ...................................... 361/760; 361/763
(58) Field of Classification Search ......... 361/760–763; 345/163–168

See application file for complete search history.

(56) References Cited

U.S. PATENT DOCUMENTS

| 7,428,646 B2 * | 9/2008 | Yang ........................... 713/300 |
| 2005/0104853 A1 * | 5/2005 | Sitalasai et al. ............. 345/163 |

* cited by examiner

Primary Examiner—Tuan T Dinh
(74) Attorney, Agent, or Firm—Bacon & Thomas, PLLC

(57) ABSTRACT

A power saving wakeup device for wireless mouse is disclosed. The wireless mouse has a microprocessor with a wake-up pin, and is waked up from the power saving mode when the wake-up pin is triggered. The wakeup device includes a contact conductor and a flexible conductor. The contact conductor is connected to the wake-up pin of the microprocessor. The flexible conductor is connected to a predetermined voltage level and separated by a predetermined distance from the contact conductor, such that the flexible conductor can contact with the contact conductor when the flexible conductor is vibrated. Thus, when the wireless mouse is moved to cause the flexible conductor to contact with the contact conductor, the wake-up pin is triggered by the predetermined potential.

6 Claims, 5 Drawing Sheets

POWER SAVING WAKE-UP DEVICE FOR WIRELESS MOUSE

BACKGROUND OF THE INVENTION

1. Field of the Invention

The present invention relates to a power saving device and, more particularly, to a power saving wake-up device for wireless mouse.

2. Description of Related Art

A typical wireless mouse uses an internal battery to provide power for its operations. Due to the limited power provided by the battery, the wireless mouse essentially has a power saving mode to save its power. As shown in FIG. 1, when a wireless mouse is not moved for a while, the microprocessor 90 will enter in a doze state and thus turns off most power to make the wireless mouse enter in a power saving mode. Subsequently, in order to determine whether the wireless mouse is moved or not, the microprocessor 90 in the wireless mouse is intermittently waked up to drive the LED 92 of the light emitting unit 91 to emit light. The light is then reflected to the photosensitive unit 93, and the photosensitive unit 93 converts the light into an electronic signal for determining whether the mouse is moved or not. Accordingly, the wireless mouse can be waked up when it is moved, and otherwise, it is kept in the power saving mode. Such a way can reduce the power consumption, but the wireless mouse cannot enter in a completely power saving mode due to the intermittent wake-up operation.

To overcome this, US Patent Publication No. 2004/0008188 entitled "Power saving mechanism for cordless electronic device" uses a shake manner to cause a vibration sensor in a wireless mouse to be a short circuit when the wireless mouse is not used for a while, to thereby produce a trigger signal to wake up the wireless mouse and further improve the power consumption caused by the intermittent wake-up operation. Thus, the wireless mouse can turn off all major power and only keep minor power. However, as shown in FIG. 2, when the wireless mouse is idle, the mercury in the vibration sensor (mercury switch) has an uncertain position, which may stay at position A or B. For the position A, it can cause the vibration sensor to be an open circuit, which does not consume any power when the wireless mouse is in the power saving mode, whereas for the position B, it can cause the vibration sensor to be a short circuit, which still consumes the power when the wireless mouse is in the power saving mode and even consumes power more than that in the normal operation. Accordingly, it is obvious that the vibration sensor cannot normally stay in an open circuit state. Thus, when the wireless mouse is not used for a while and enters in the power saving mode, and the vibration sensor is at a short circuit state (so as to form a short circuit loop), the power can be consumed through the short circuit loop. In this case, the wireless mouse cannot achieve the power saving effect.

Therefore, it is desirable to provide an improved power saving wake-up device for wireless mouse to mitigate and/or obviate the aforementioned problems.

SUMMARY OF THE INVENTION

An object of the invention is to provide a power saving wake-up device for wireless mouse, which can make a wireless mouse not moved for a while to completely enter in a power saving mode without using an intermittent test to check if the wireless mouse is moved, thereby obtaining the most power saving.

Another object of the invention is to provide a power saving wake-up device for wireless mouse, which can ensure the power saving wake-up device an effective operation.

According to a feature of the invention, a power saving wake-up device for wireless mouse is provided. The wireless mouse has a microprocessor with a wake-up pin. The wireless mouse enters in a power saving mode to save power consumption. When the wake-up pin of the microprocessor is triggered, the wireless mouse in the power saving mode is waked up. The power saving wake-up device includes: a flexible conductor, which is connected to the wake-up pin of the microprocessor; and a contact conduct, which is connected to a predetermined voltage level and separated by a predetermined distance from the contact conductor, wherein the predetermined distance is such a distance to allow the flexible conduct in vibration to contact with the contact conductor, such that when the wireless mouse is moved to cause the flexible conductor to contact with the contact conductor, the wake-up pin is triggered by the predetermined voltage level.

According to another feature of the invention, a power saving wake-up device for wireless mouse is provided. The wireless mouse has a microprocessor with two wake-up pins. The wireless mouse enters in a power saving mode to save power consumption. The microprocessor uses at least one wake-up pin as a trigger such that when the wake-up pin is triggered, the wireless mouse in the power saving mode is waked up. The power saving wake-up device includes: first to fourth conductive plates, which form a quadrilateral with separated adjacent laterals, wherein the first and the third conductive plates are opposite to each other and both connected to a predetermined voltage level, and the second and the fourth conductive plates are opposite to each other and connected to the respective wake-up pins of the microprocessor; and a movable conductor, which is movably implemented in the quadrilateral and concurrently contacts with at most two adjacent conductive plates to thereby conduct the two conductive plates, such that when the wireless mouse is moved to cause the movable conductor to contact with the two conductive plates, the wake-up pin used as the trigger source by the microprocessor is triggered by the predetermined voltage level.

According to a further feature of the invention, a power saving wake-up device for wireless mouse is provided. The wireless mouse has a microprocessor with a wake-up pin. The wireless mouse enters in a power saving mode to save power consumption. The wireless mouse in the power saving mode is waked up when the wake-up pin is triggered. The power saving wake-up device includes: an electrical exciting unit, which is connected to the wake-up pin of the microprocessor in order to produce a voltage level to trigger the wake-up pin when the wireless mouse is moved.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
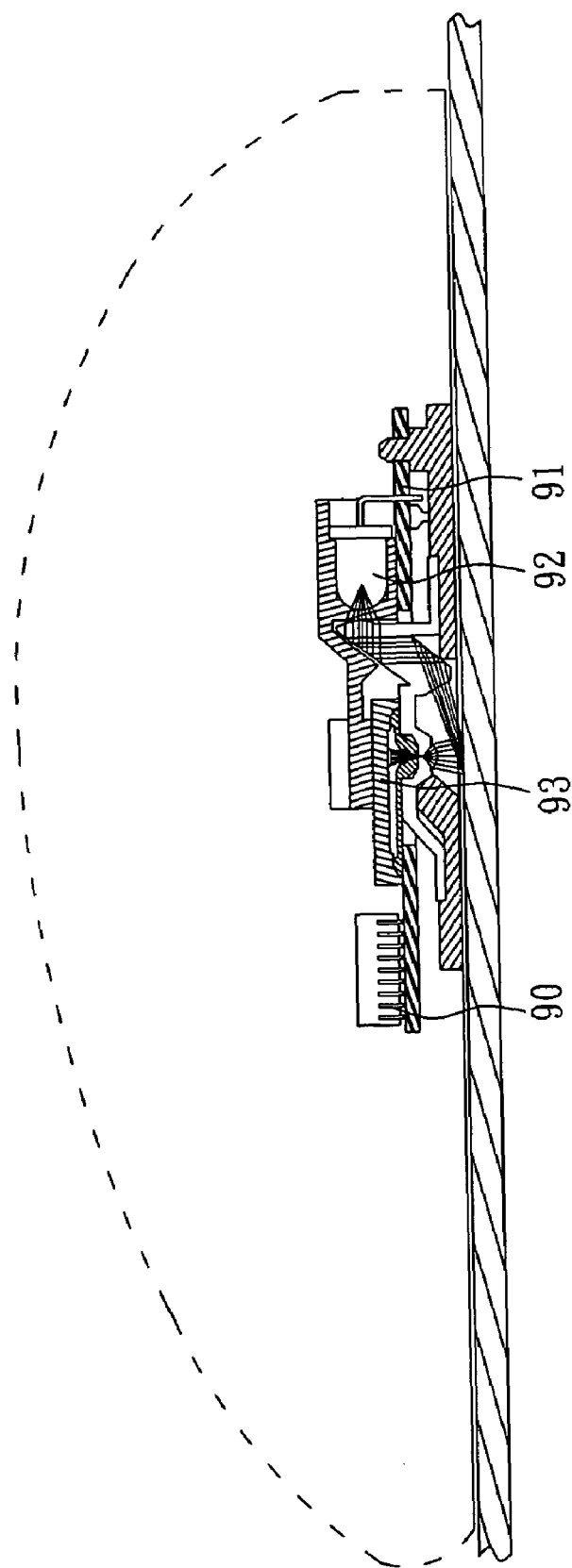
FIG. 1 is a cross-sectional view of a typical wireless mouse.
Figure 2:
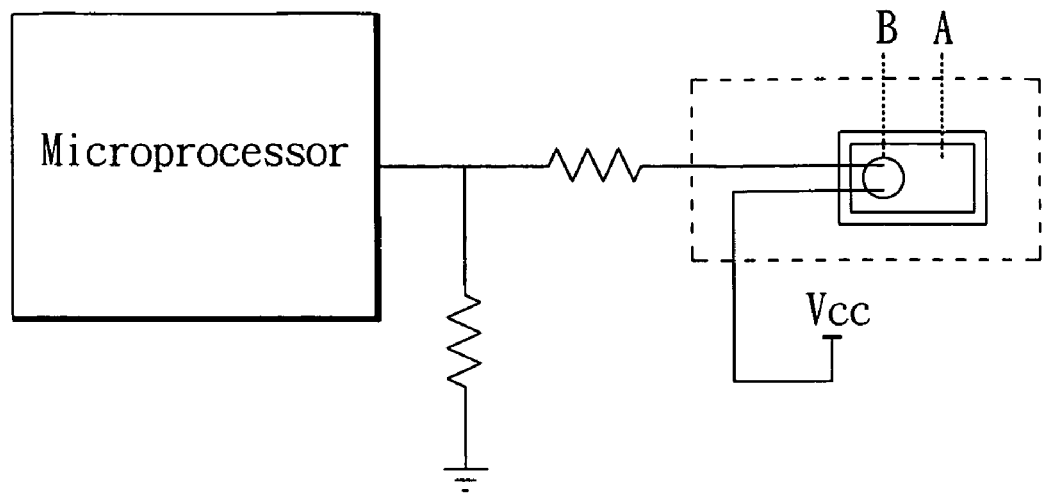
FIG. 2 is a schematic diagram of a typical power saving mechanism.
Figure 3:
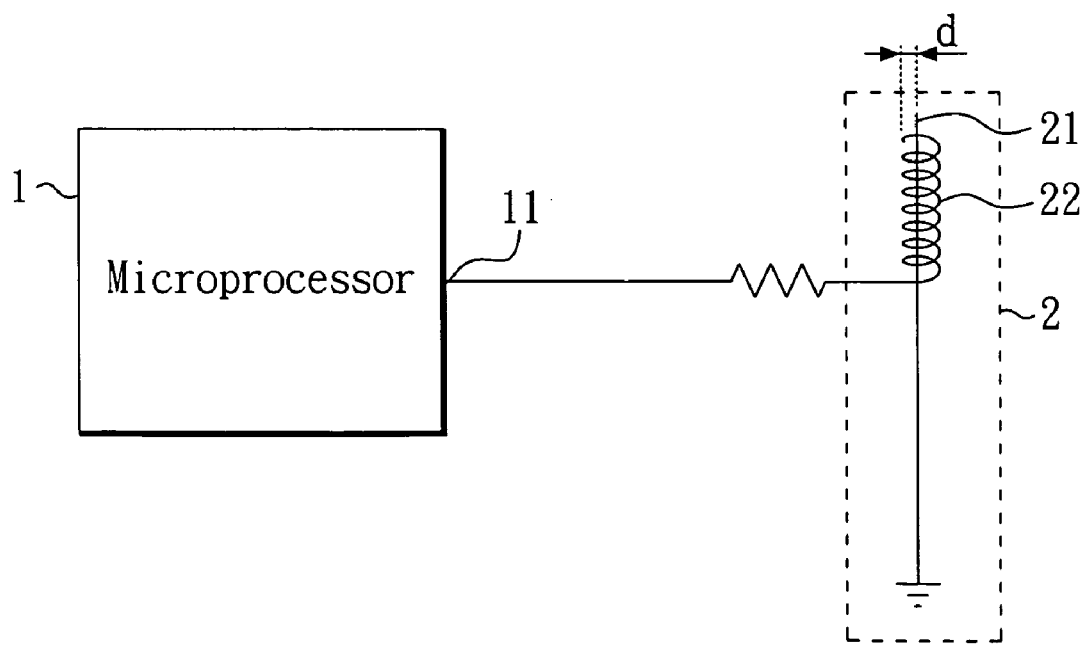
FIG. 3 is a schematic diagram of a first embodiment of a power saving wake-up device for wireless mouse according to the invention.

FIG. 3 is a schematic diagram of a first embodiment of a power saving wake-up device for wireless mouse according to the invention. In FIG. 3, the wireless mouse includes a microprocessor 1 and a wake-up device 2. The microprocessor 1 has a wake-up pin 11. The wake-up device 2 has a contact conductor 21 and a flexible conductor 22. The flexible conductor 22 is connected to the wake-up pin 11 of the microprocessor 1. The contact conductor 21 is connected to a predetermined voltage level such as a ground level. The flexible conductor 22 is normally separated by a distance 'd' from the contact conductor 21. Accordingly, when the flexible conductor 22 is vibrated, it can contact with the contact conductor 21. In this embodiment, the contact conductor 21 is preferred to be a metal needle object, and the flexible conductor 22 is preferred to be a spring surrounding the contact conductor 21.

In this embodiment, when the wireless mouse is idle for a while, it enters in a power saving mode to save the power consumption. When a user moves the wireless mouse again, the flexible conductor 22 of the wake-up device 2 of the wireless mouse receives a force and swings left and right to thus contact with the contact conductor 21 and trigger the wake-up pin 11 of the microprocessor 1 through the predetermined voltage level coupled to the contact conductor 21, thereby waking up the wireless mouse in the power saving mode.

Figure 4:
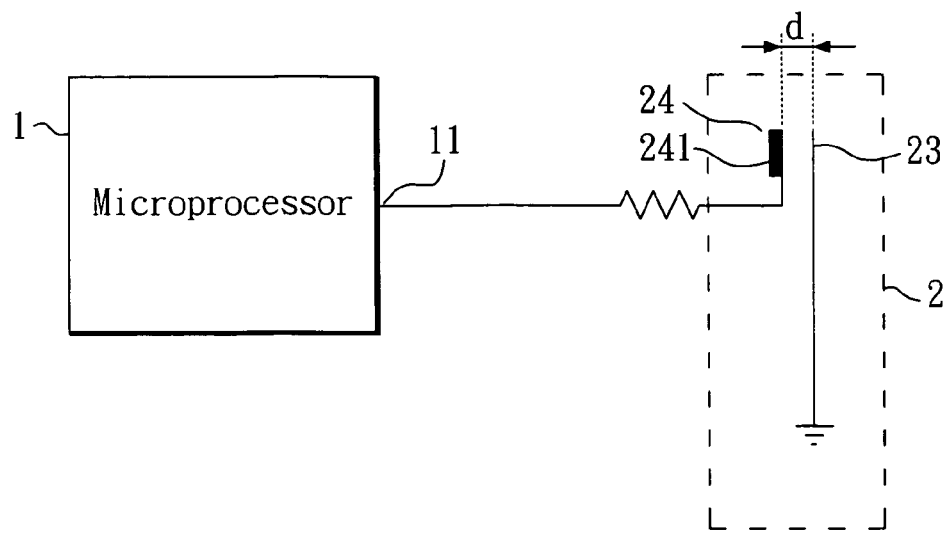
FIG. 4 is a schematic diagram of a second embodiment of a power saving wake-up device for wireless mouse according to the invention.

In addition, FIG. 4 is a schematic diagram of a second embodiment of the invention. This embodiment is operating as same as the first embodiment, but constructs a different flexible conductor 24. The flexible conductor 24 is an elastic fragment. The top of the elastic fragment is provided with a weight element 241. The flexible conductor 24 is implemented aside the contact conductor 23, and separated by a distance 'd' from the contact conductor 23. Accordingly, when the flexible conductor 24 is vibrated, it can contact with the contact conductor 23. The flexible conductor 24 is connected to the wake-up pin 11 of the microprocessor 1. The contact conductor 23 is connected to a predetermined voltage level such as a ground level. Thus, when the mouse enters in the power saving mode, and a user moves the wireless mouse again, the flexible conductor 24 receives a force and swings left and right to thus contact with the contact conductor 23 and trigger the wake-up pin 11 of the microprocessor 1 through the predetermined voltage level coupled to the contact conductor 21, thereby waking up the wireless mouse in the power saving mode.

As cited, the first and the second embodiments can provide a power saving wake-up device for wireless mouse to make the wireless mouse enter in the power saving mode after the wireless mouse is not moved for a while, without intermittently checking if the wireless mouse is moved, thereby saving the most power consumption. In addition, since the contact conductor is normally separated from the flexible conductor, the wake-up device of the wireless mouse to be effectively operated for the power saving function is ensured.

Figure 5:
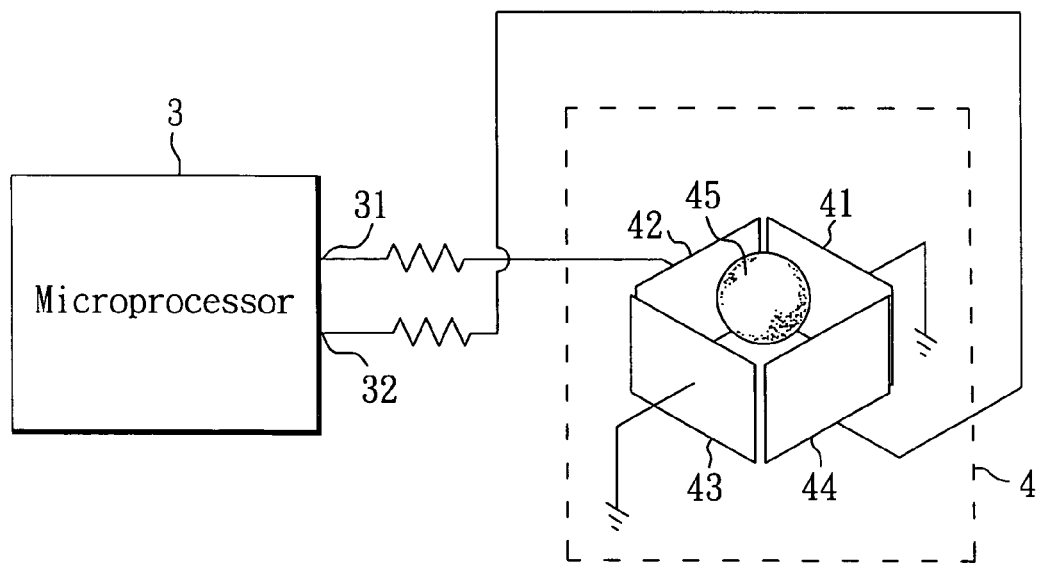
FIG. 5 is a schematic diagram of a third embodiment of a power saving wake-up device for wireless mouse according to the invention.

Further, FIG. 5 is a schematic diagram of a third embodiment of the invention. In this embodiment, the wireless mouse includes a microprocessor 3 and a wake-up device 4. The microprocessor 3 has two wake-up pins 31 and 32. The mechanism 4 has first to fourth conductive plates 41, 42, 43, 44 and a movable conductor 45. The first to fourth conductive plates 41, 42, 43 and 44 form a quadrilateral with separated adjacent laterals, wherein the first and the third conductive plates 41, 43 are opposite to each other and both connected to a predetermined voltage level such as ground level, and the second and the fourth conductive plates 42, 44 are opposite to each other and connected to the respective wake-up pins 31 and 32 of the microprocessor 3. The movable conductor 45 is movably implemented in the quadrilateral and may concurrently contact with at most two adjacent conductive plates 41-44 to thereby conduct the two conductive plates. In this embodiment, the movable conductor 45 is preferred to be a metal ball, and the quadrilateral formed by the first to fourth conductive plates 41-44 is a square or rectangle.

Figure 6:
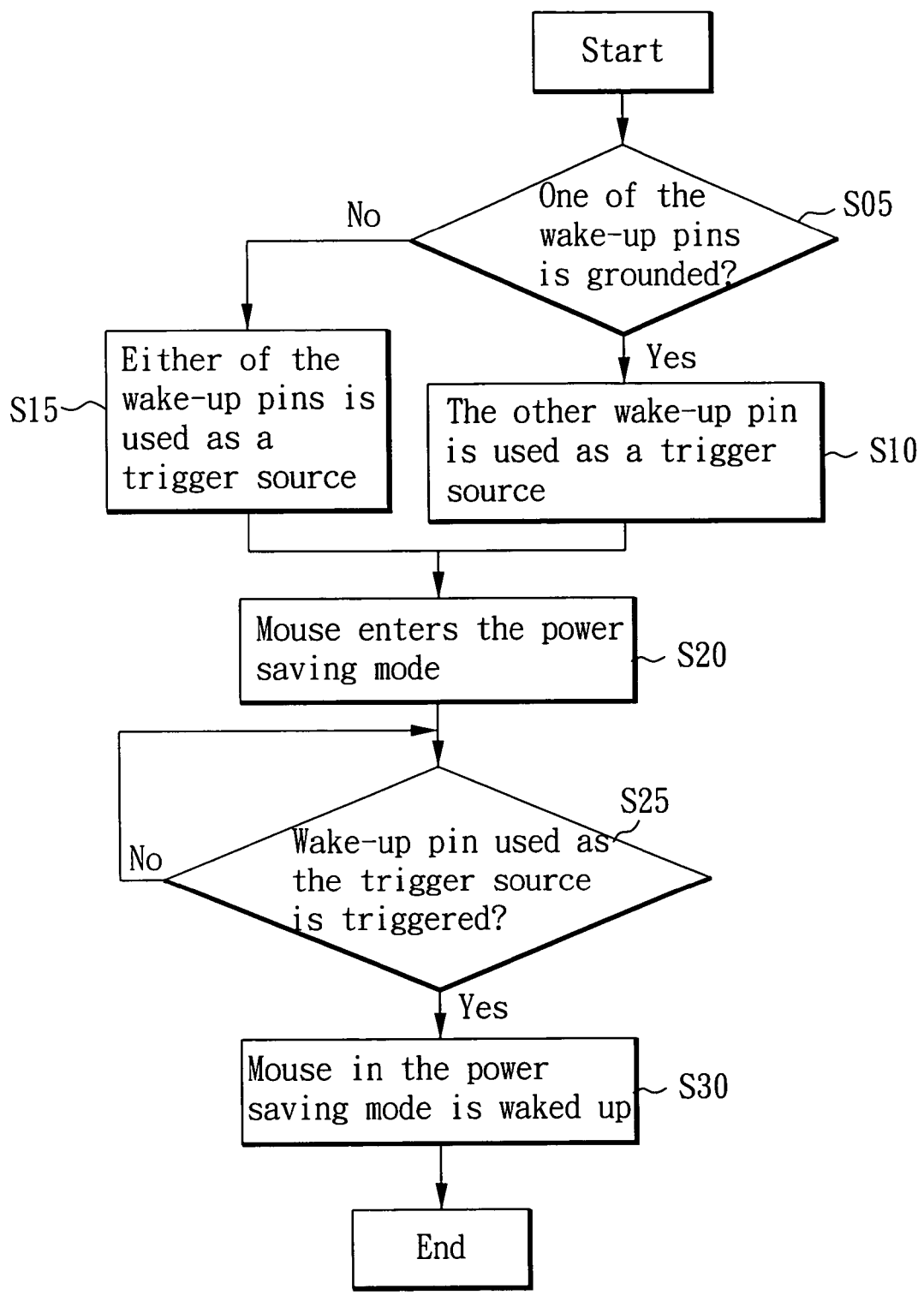
FIG. 6 is a flowchart of the third embodiment of FIG. 5 according to the invention.

FIG. 6 is a flowchart of the third embodiment of FIG. 5 according to the invention. As shown in FIGS. 5 and 6, when the wireless mouse is idle for a while and desires to enter in the power saving mode, it first determines whether the wake-up pins 31 and 32 are connected to ground level or not (step S05). If one, such as the wake-up pin 31, is connected to ground level, the microprocessor 3 sets the other wake-up pin 32 as a trigger source (step S10). If none of the wake-up pins 31 and 32 is connected to the ground level, the microprocessor 3 sets both the wake-up pins 31 and 32 as the trigger sources (step S15). Next, the wireless mouse enters in the power saving mode (step S20). When a user moves the wireless mouse again, the movable conductor 45 receives a force and accordingly moves or rotates freely. Thus, the movable conductor 45 will contact with two adjacent conductive plates 41-44, which can connect the wake-up pin 31 or both wake-up pins 31 and 32 to the predetermined voltage level in order to trigger the wake-up pin 31 or both wake-up pins 31 and 32 through the predetermined voltage level (step S25) to thereby wake up the mouse in the power saving mode (step S30).

Accordingly, the third embodiment can provide a power saving wake-up device for wireless mouse to make the wireless mouse enter in the power saving mode after the wireless mouse is not moved for a while, without intermittently checking if the wireless mouse is moved, thereby saving the most power consumption. In addition, when the wireless mouse is idle, no matter whether or not the movable conductor 45 contacts with the conductive plates 41-44, the power consumption is not presented, so the wake-up device for the wireless mouse to be effectively operated for the power saving function is ensured. In the above embodiments, the predetermined voltage level is the ground level GND for illustrative purpose. Therefore, the wake-up pin or pins of the microprocessor is set to high level internally or is pulled high by an external pull-high resistor, so as to keep the wake-up pin or pins at high level normally. Alternatively, the predetermined voltage level can be a positive system voltage VCC. In such a case, the wake-up pin or pins of the microprocessor is set to low level internally or is pulled low by an external pull-low resistor, so as to keep the wake-up pin or pins at low level (ground) normally. The wake-up pin or pins of the microprocessor is thus triggered by the positive high voltage level. This alternative implementation can be known to those skilled in the art and thus a detailed description is deemed unnecessary.

Figure 7:
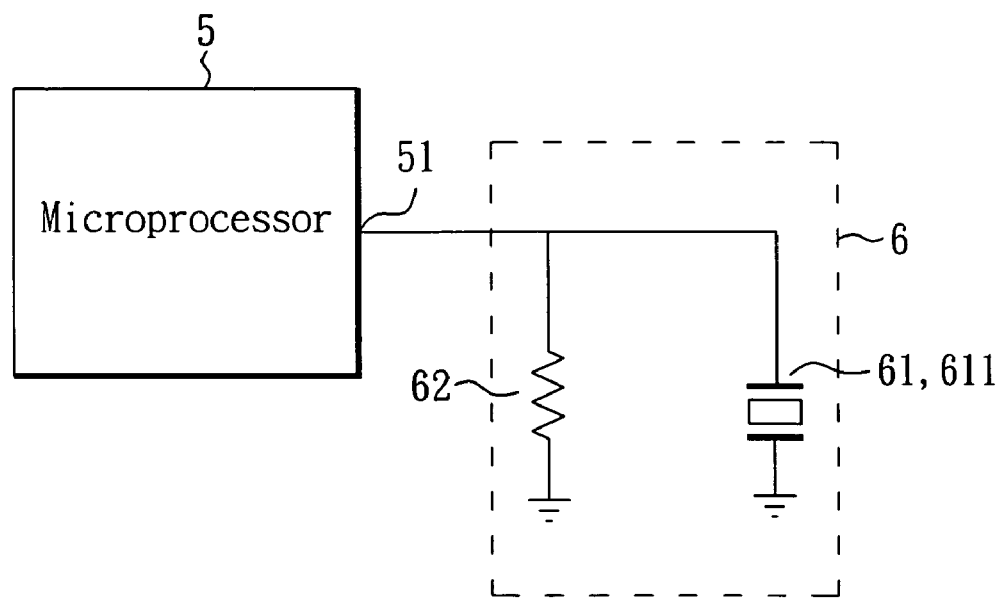
FIG. 7 is a schematic diagram of a fourth embodiment of a power saving wake-up device for wireless mouse according to the invention.

FIG. 7 is a schematic diagram of a fourth embodiment according to the invention. In FIG. 7, the wireless mouse includes a microprocessor 5 and a wake-up device 6. The microprocessor 5 has a wake-up pin 51. The wake-up device 6 has an electrical exciting unit 61 and a resistor 62. The electrical exciting unit 61 is connected to the wake-up pin 51 of the microprocessor 5. The resistor 62 is coupled between the wake-up pin 51 of the microprocessor 5 and a ground level, such that the wake-up pin 51 of the microprocessor 5 is normally connected to a low voltage level to further avoid an excess current suddenly flowing into the microprocessor 5 and thus prevent the microprocessor 5 from a damage. In this embodiment, the electrical exciting unit 61 is preferred to be a piezoelectrical device 611.

In this embodiment, when the wireless mouse is idle for a while, it enters in a power saving mode to save power consumption. When the wireless mouse is moved again, the piezoelectrical device 611 of the wake-up device 6 is excited by the movement to thus produce a voltage signal, and also the wake-up pin 51 of the microprocessor 5 is triggered, thereby waking up the wireless mouse in the power saving mode.

Figure 8:
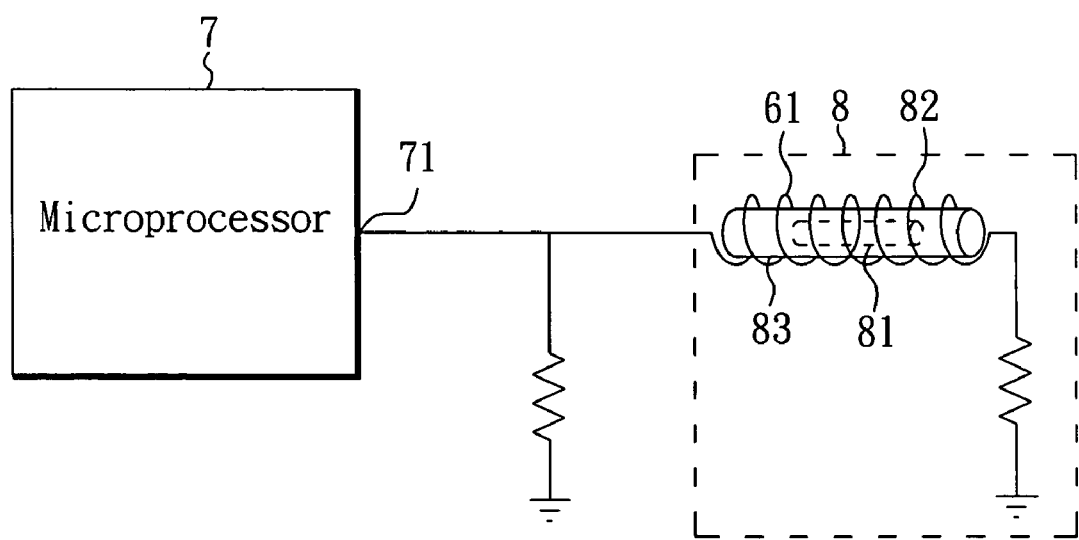
FIG. 8 is a schematic diagram of a fifth embodiment of a power saving wake-up device for wireless mouse according to the invention.

FIG. 8 is a schematic diagram of a fifth embodiment according to the invention. This embodiment is similar to the fourth embodiment except that the electrical exciting unit is replaced by an electromagnetic induction generator 8, which is further described as follows.

As shown in FIG. 8, the electromagnetic induction generator 8 has a magnet 81, coil 82 and an insulator 83. The insulator 83 is formed of a non-conductive material such as plastic. The magnet 81 is implemented in the insulator 83 to thereby prevent the magnet 81 from contacting with the coil 82. The coil 82 is wound on the outer surface of the insulator 83, and has one end connected to the wake-up pin 71 of the microprocessor 7 and the other end connected to the ground level.

When the wireless mouse is idle for a while, it enters in a power saving mode to save power consumption. When the wireless mouse is moved again, it causes the magnet 81 to move, which induces a voltage signal on the coil 82 and further triggers the wake-up pin 71 of the microprocessor 7. Thus, the wireless mouse in the power saving mode is waked up.

As cited, the fourth and the fifth embodiments can provide a power saving wake-up device for wireless mouse to make the wireless mouse enter in the power saving mode after the wireless mouse is not moved for a while, without intermittently checking if the wireless mouse is moved, thereby saving the most power consumption. In addition, when the wireless mouse is idle, the electrical exciting unit does not produce the voltage signal. Thus, it ensures the wake-up device of the wireless mouse an effective operation for the power saving function.

Although the present invention has been explained in relation to its preferred embodiment, it is to be understood that many other possible modifications and variations can be made without departing from the spirit and scope of the invention as hereinafter claimed.

What is claimed is:

1. A power saving wake-up device for wireless mouse, the wireless mouse having a microprocessor with two wake-up pins, such that when the wireless mouse enters in a power saving mode to save power consumption and subsequently at least one wake-up pin used as a trigger source by the microprocessor is triggered, the wireless mouse in the power saving mode is waked up, the device comprising:

first to fourth conductive plates, which form a quadrilateral with separated adjacent laterals, wherein the first and the third conductive plates are opposite to each other and both connected to a predetermined voltage level, and the second and the fourth conductive plates are opposite to each other and connected to the respective wake-up pins of the microprocessor; and a movable conductor, which is movably implemented in the quadrilateral and concurrently contacts with at most two adjacent conductive plates to thereby conduct the two conductive plates, such that when the wireless mouse is moved to cause the movable conductor to contact with the two conductive plates, the wake-up pin used as the trigger source by the microprocessor is triggered by the predetermined voltage level.

2. The power saving wake-up device as claimed in claim 1, wherein the movable conductor is a metal ball.

3. The power saving wake-up device as claimed in claim 1, wherein the quadrilateral is a square or rectangle.

4. The power saving wake-up device as claimed in claim 1, wherein when the wireless mouse desires to enter in the power saving mode, the microprocessor sets the other two wake-up pins as trigger sources if one of the two wake-up pins is connected to the predetermined voltage level, and sets the two wake-up pins as trigger sources if the two wake-up pins are not connected to the predetermined potential.

5. The power saving wake-up device as claimed in claim 1, wherein the wake-up pins of the microprocessor are preset to a high voltage level and the predetermined voltage level is a ground voltage level.

6. The power saving wake-up device as claimed in claim 1, wherein the wake-up pins of the microprocessor are preset to a low voltage level and the predetermined voltage level is a positive high voltage level.

* * * * *